Patented May 21, 1946

UNITED STATES PATENT OFFICE 2,400,578

PRODUCTION OF EMULSION POLYMERIZATES

Byron M. Vanderbilt, Westfield, N. J., and Harold J. Rose, East Baton Rouge, La., assignors to Standard Oil Development Company, a corporation of Delaware No Drawing. Application December 1, 1943, Serial No. 512,488

4 Claims. (Cl. 260—86.5)

The present invention pertains to the production of synthetic rubber-like materials by an emulsion polymerization process and particularly to the production of emulsion copolymerizates of certain diolefin hydrocarbons with styrene or substituted styrenes.

It has been known for some time that synthetic rubber-like materials can be prepared by polymerizing a diolefin hydrocarbin in admixture with styrene in aqueous emulsion. Diolefin hydrocarbons suggested for this purpose have included butadiene-1,3, isoprene, piperylene and dimethylbutadiene. The most important polymer of this class has been that produced from a mixture of about 75% of butadiene and about 25% of styrene, commonly known as Buna-S. This copolymer has been of particular interest as a substitute for natural rubber in tire tread stock wherein it has shown itself to be equal, if not superior, to natural rubber in wear resistance.

Serious problems have been encountered in the manufacture of tires and other products from Buna-S because of its toughness or lack of plasticity. As ordinarily prepared, Buna-S can only, with the greatest difficulty, be worked up on ordinary rubber milling equipment. This difficulty has been overcome in part by the use of higher molecular aliphatic mercaptans as polymerization modifiers; or by subjecting the finished polymers to an oxidizing treatment at elevated temperatures and in the presence of an anti-oxidant.

When isoprene was substituted for the butadiene in the preparation of emulsion copolymers with styrene the results obtained were definitely inferior in one or more ways. For example, when a conventional butadiene Buna-S polymerization recipe was used, the isoprene-styrene copolymers were much too soft and lacked tensile strength. When the polymerization recipe was altered to overcome this objection copolymers of isoprene and styrene were obtained which possessed satisfactory plasticity and tensile strength but they were formed in poor yields. In view of the low conversions obtained when products of satisfactory plasticity and tensile strength were prepared and the inferior properties of the product when produced under conditions giving high yields, the manufacture of isoprene-styrene copolymers appeared to be of no commercial interest.

It is the object of the present invention to provide the art with certain novel emulsion copolymerizates having new and superior properties.

It is also the object of this invention to prepare emulsion copolymerizates having the wear resistance of Buna-S but which are much more plastic and more easily worked on ordinary rubber milling equipment.

It is a further object of this invention to prepare emulsion copolymerizates from mixtures comprising styrene and isoprene which not only possess good plasticity and tensile strength but which will also be formed in sufficiently high yields to be of commercial interest.

These and other objects will appear more clearly from the detailed description and claims which follow.

It has now been found that if mixtures of isoprene and butadiene are used as the diolefin reactant when preparing copolymerizates with styrene, a product is obtained which has essentially the good physical characteristics of the butadiene-styrene copolymers, i. e., high tensile strength, elongation, modulus and wear resistance but which is much more plastic and, therefore, more easily worked up or mixed with the ordinary compounding ingredients preparatory to the formation of vulcanizates therefrom than the usual butadiene-styrene copolymers. It has been found that, surprisingly, the tripolymer of butadiene, isoprene and styrene does not exhibit the inferior properties that would be expected or predicted from the properties of the respective two component polymers, i. e., the butadiene-styrene and the isoprene-styrene copolymers. It has further been found that tripolymers of butadiene, isoprene and styrene may be prepared at high conversion levels without detriment to the physical properties of the product even when the isoprene is the principal diolefin reactant. The butadiene, isoprene and styrene are preferably used in the ratio of 37.5:37.5:25, although the ratio of diolefin to styrene may be varied between about 90 to 10 to about 50 to 50. Although the diolefinic reactants preferably consist of equal parts of butadiene and isoprene, the proportions may be varied from 10 parts of isoprene to 90 parts of butadiene to about 75 parts of isoprene to 25 of butadiene. Instead of styrene per sé, we may also use substituted styrenes such as alpha methyl styrene, para methyl styrene, alpha methyl para methyl styrene and the like.

Our novel tripolymers may be prepared as follows: About 1-5% of an emulsifier such as sodium oleate or stearate, a salt of an alkylated naphthalene sulfonic acid or the like, about 0.5-2.5% of a polymerization catalyst such as hydrogen peroxide or an alkali metal or ammonium persulfate or perborate and about 0.5 to 5% of a polymerization modifier such as a high molecular weight mercaptan such as dodecyl or Lorol mercaptan or a dialkyl xanthogen disulfide, are added to water. The weight of water is usually double the weight of polymerizable materials. The styrene is then added to the above mixture and finally the diolefin. The butadiene and isoprene may be added to the above mixture separately or in admixture. The mixture is well agitated and maintained at a temperature of 30–45° C. for about 16–24 hours or until the desired conversion is obtained, i. e., about 75% based on the polymerizable hydrocarbons charged. It will be understood that our invention is not limited to the foregoing conditions since variations within the skill of the art may be made therein without departing from the spirit of our invention.

The following example is illustrative of the present invention:

A mixture consisting of 400 parts of water, 75 parts of butadiene, 75 parts of isoprene, 50 parts of styrene, 5 parts of a commercial tallow soap, 0.6 part of potassium persulfate and one part of a $C_{12}$ mercaptan prepared from commercial lauryl alcohol was emulsified and heated in a pressure vessel while mixing for a total of 16 hours. A temperature of 117° F. was maintained throughout the reaction. The latex thus obtained was freed of volatile unreacted materials by flashing off, stabilized by the addition of 3 parts of phenyl beta naphthylamine in emulsion then coagulated by means of a saturated sodium chloride solution. The coagulate was washed substantially free from soap by means of warm water and then dried in a stream of warm air. The yield of copolymer based upon the reactants amounted to 75%. The Mooney viscosity of the copolymerizate thus obtained was determined. This copolymer was then compounded according to the following formula:

| | Parts |
|---|---|
| Polymer | 100 |
| Zinc oxide | 5 |
| Stearic acid | 2 |
| Sulfur | 2 |
| Channel black | 50 |
| A thiazole type accelerator sold under the trade name of Santocure | 1 |

The foregoing composition, a typical tire tread type recipe, was vulcanized for 60 minutes at 293° F., whereupon the tensile strength, ultimate elongation and modulus at 300% elongation of the resultant vulcanizate were determined. The data from this run are summarized under A in the table set out below.

The same procedure described above was carried out except that 150 parts of butadiene were used instead of 75 parts butadiene and 75 parts of isoprene. The yield of copolymer based upon the reactants amounted to 78%. The results obtained upon evaluating this copolymer in the same manner as the above-mentioned tripolymer are summarized under B in the following table:

| | A | B |
|---|---|---|
| Diolefin | 50% butadiene 50% isoprene | 100% butadiene. |
| Tensile strength, #/sq. in | 3600 | 3700. |
| Ultimate elongation | 500% | 440%. |
| Modulus at 300% | 1425 | 1800. |
| Mooney viscosity: | | |
| (a) Pure gum | 62 | 78. |
| (b) Compounded | 76 | 126. |
| Banding time | 5 min | 10 min. |

When the same procedure was followed as under A except that 150 parts of isoprene were used instead of 75 parts of butadiene and 75 parts of isoprene, the polymer was formed in yields below 50% and was found to be a sticky, semi-solid material that was too soft and lacking in tensile strength to be useful in the manufacture of the tread stock. Cutting the amount of mercaptan used in half gave an improvement in the physical properties of the copolymer but the yield was only about 55% with a reaction time of 22½ hours and was only about 65% with a reaction time of 30 hours. Substitution of a higher molecular mercaptan such as octadecyl mercaptan or mixtures of octadecyl mercaptan with diisopropyl xanthogen disulfide permits the attainment of products of satisfactory physical properties but the conversion level can only be raised to 75% by increasing the reaction time to around 40 hours.

It may be clearly seen from these data that the tripolymer in accordance with the present invention is much easier to process or work up on rubber milling equipment as indicated by the Mooney viscosities and the banding times. It was also observed in a milling test that the tripolymer in accordance with the present invention increased 73° C. in temperature, whereas the butadiene-styrene copolymer increased 88° C. The banding time is the time required to form a complete band when 200 g. of polymer is milled on a 6" x 12" rubber mill set at 0.030". The ability to form a band quickly and to heat up the minimum is advantageous from the standpoint of processing in large scale rubber fabricating equipment.

The foregoing disclosure contains a limited number of embodiments of our invention but it will be understood that the invention is by no means limited thereto since numerous variations are possible within the scope of the following claims.

What we claim and desire to secure by Letters Patent is:

1. The process of preparing synthetic rubber-like materials which comprises polymerizing in aqueous emulsion, a mixture of about 10 to 50 parts of a compound selected from the group consisting of styrene and methyl substituted styrenes with from about 90 to 50 parts of a mixture of about 10 to 75 parts of isoprene with about 90 to 25 parts of butadiene-1,3.

2. The process of preparing synthetic rubber-like materials which comprises polymerizing in aqueous emulsion a mixture of about three parts each of butadiene-1,3 and isoprene and two parts of styrene.

3. The synthetic rubber-like aqueous emulsion copolymerizate prepared from 90 to 50 parts of a diolefin mixture consisting of 10 to 75 parts of isoprene and 90 to 25 parts of butadiene-1,3 and 10 to 50 parts of a compound selected from the group consisting of styrene and methyl substituted styrenes.

4. The synthetic rubber-like aqueous emulsion copolymerizate prepared from a monomeric mixture consisting of approximately three parts of butadiene-1,3, three parts of isoprene and two parts of styrene.

BYRON M. VANDERBILT.
HAROLD J. ROSE.